United States Patent
Iwato et al.

(10) Patent No.: US 11,480,850 B2
(45) Date of Patent: Oct. 25, 2022

(54) OPTICAL UNIT

(71) Applicant: NIDEC COPAL CORPORATION, Tokyo (JP)

(72) Inventors: Shozo Iwato, Tokyo (JP); Koji Sawanobori, Tokyo (JP); Kazuo Shikama, Tokyo (JP); Kenzo Imai, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 482 days.

(21) Appl. No.: 16/470,528

(22) PCT Filed: Nov. 24, 2017

(86) PCT No.: PCT/JP2017/042260
§ 371 (c)(1),
(2) Date: Jun. 17, 2019

(87) PCT Pub. No.: WO2018/110250
PCT Pub. Date: Jun. 21, 2018

(65) Prior Publication Data
US 2019/0324349 A1    Oct. 24, 2019

(30) Foreign Application Priority Data
Dec. 16, 2016   (JP) .............................. JP2016-244497

(51) Int. Cl.
*G03B 9/06*    (2021.01)
*G02B 7/02*    (2021.01)

(52) U.S. Cl.
CPC ............... *G03B 9/06* (2013.01); *G02B 7/021* (2013.01)

(58) Field of Classification Search
None
See application file for complete search history.

(56) References Cited

U.S. PATENT DOCUMENTS 7,899,311 B1 *   3/2011   Kearney .................. G03B 9/08
                                                                396/12

FOREIGN PATENT DOCUMENTS

| CN | 102650799 A | * | 8/2012 | ............. G02B 26/02 |
| JP | 2000-214369 A | | 8/2000 | |
| JP | 2004-361590 A | | 12/2004 | |

(Continued)

OTHER PUBLICATIONS

International Search Report issued in corresponding International Patent Application No. PCT/JP2017/242260 dated Feb. 13, 2018.

*Primary Examiner* — Leon W Rhodes, Jr.
(74) *Attorney, Agent, or Firm* — Troutman Pepper Hamilton Sanders LLP (57) ABSTRACT

An optical unit has a lens frame that has a slit in a cylinder, and a blade driving device, comprising an insertion portion for insertion into the slit, wherein an opening, provided in the insertion portion, is disposed between lenses in a lens frame, wherein: the blade driving device comprises a frame that has a recessed lens frame storing portion with the insertion portion protruding; a cylinder of the lens frame comprises a pair of supporting faces that are perpendicular to the optical axis of the lens; and the lens frame storing portion of the frame has contact surfaces that contact each of a pair of supporting faces.

8 Claims, 7 Drawing Sheets

(56) References Cited

FOREIGN PATENT DOCUMENTS

| | | | |
|---|---|---|---|
| JP | 2004348030 A | * | 12/2004 |
| JP | 2006-47364 A | | 2/2006 |
| JP | 2007-271670 A | | 10/2007 |

* cited by examiner

Enlargement of the T Portion

OPTICAL UNIT

Cross Reference to Related Applications

This is a U.S. National Phase Application under 35 U.S.C. § 371 of International Patent Application No. PCT/JP2017/042260, filed Nov. 24, 2017, which claims priority of Japanese Patent Application No. 2016-244497, filed Dec. 16, 2016. The entire contents of which are hereby incorporated by reference.

FIELD OF TECHNOLOGY

The present invention relates to an optical unit that is equipped in an imaging device, or the like.

BACKGROUND

Blade driving devices are used to change the state of an opening by driving one or more blade members that advance into the opening, and are used in diaphragms, shutters, diaphragm-shutters, filters, and the like. There are known optical units that combine blade driving devices and lens frames that are structured with a blade driving device having an insertion portion that has an opening, where the insertion portion is inserted into a slit provided in an outer lens cylinder of the lens frame (referencing Japanese Unexamined Patent Application Publication 2007-271670).

SUMMARY

Because the spacing between lenses in a lens frame is narrow, in a blade driving device equipped in a small optical unit it is difficult to insert the insertion portion of the blade driving device between lenses without contacting a lens. Moreover, when a load acts on the insertion portion after insertion, there may be a failure such as the insertion portion deforming, or a failure wherein the positional relationship between the lens frame and the blade driving device after insertion shifts in the optical axial direction, so that the insertion portion makes contact with a lens.

In order to solve such a problem, the optical unit according to the present invention is provided with the following structures:

An optical unit, comprising: a lens frame that has a slit in a cylinder; and a blade driving device, comprising an insertion portion for insertion into the slit, wherein an opening that is provided in the insertion portion is disposed between lenses in the lens frame, wherein: the blade driving device comprises a frame that has a recessed lens frame storing portion with the insertion portion protruding; the cylinder of the lens frame has a pair of supporting faces that are perpendicular to the optical axis of the lens; and the lens frame storing portion of the frame has contact surfaces that contact each of the pair of supporting faces.

BRIEF DESCRIPTIONS OF THE DRAWINGS

FIGs. 1a-1b are an explanatory diagrams depicting an optical unit according to an example according to the present invention (wherein FIG. 1a is a plan view and FIG. 1b is a cross-sectional view along the section A-A in FIG. 1a.

FIG. 2 is a cross-sectional view along the section B-B in FIG. 1a.

DETAILED DESCRIPTION

Examples according to the present invention will be explained below in reference to the drawings. In the descriptions below, identical reference symbols in the different drawings below indicate positions with identical functions, and redundant explanations in the various drawings are omitted as appropriate.

Figure 1A:
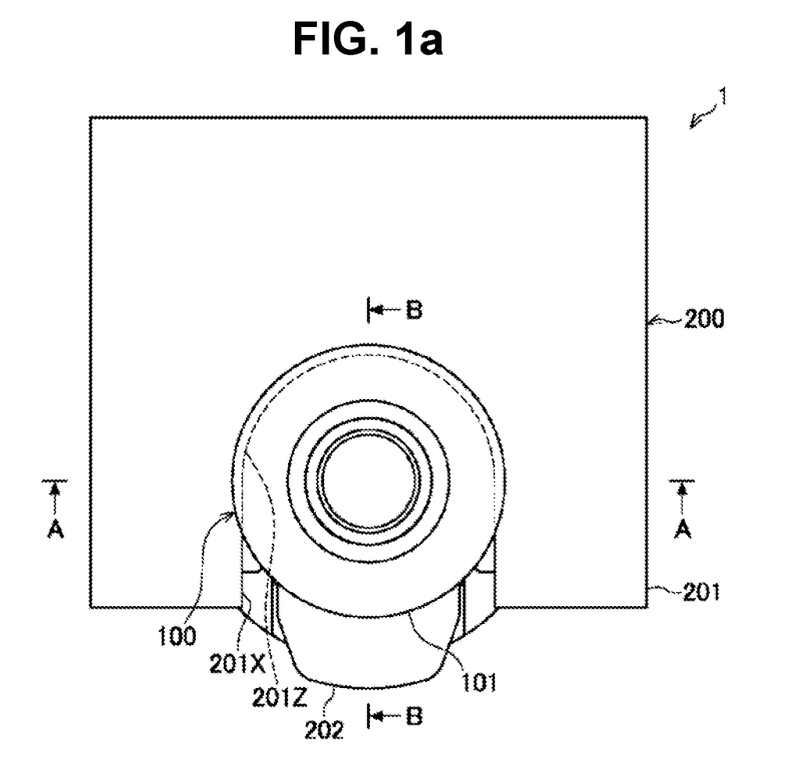
Figure 1B:
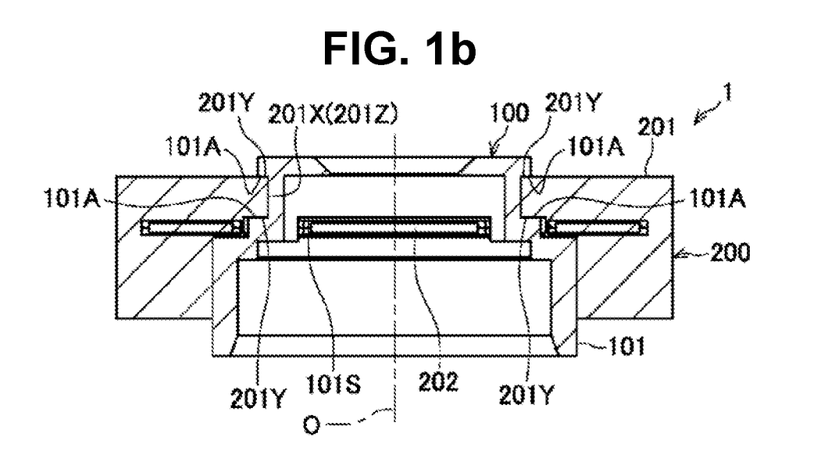
Figure 2:
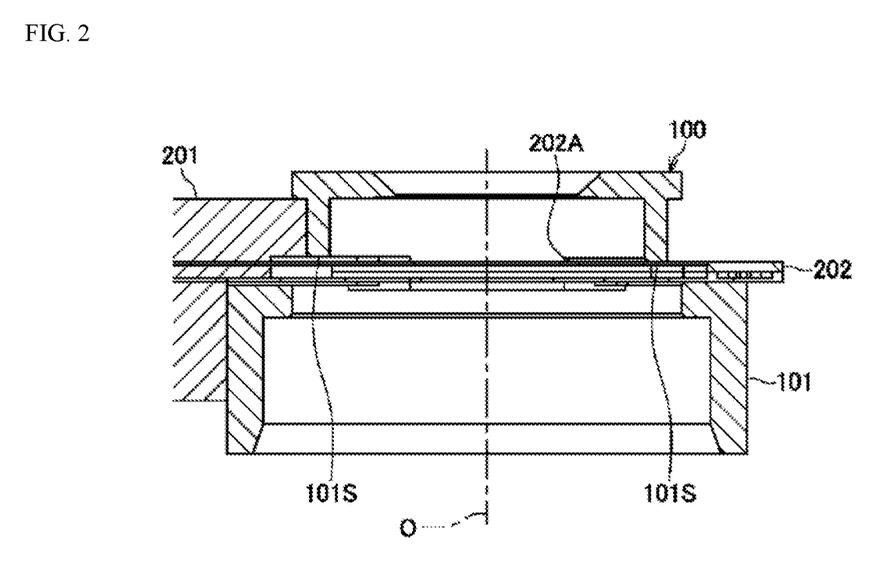

The optical unit 1 depicted in FIGS. 1a-1b, and FIG. 2 comprise a lens frame 100 and a blade driving device 200. The lens frame 100 has a cylinder 101 for supporting a lens, not shown, in the interior thereof, where the cylinder 101 has a slit 101S. In contrast, the blade driving device 200 comprises a frame 201, and an insertion portion 202 that protrudes from the frame 201. For the lens frame 100 and the blade driving device 200, through insertion of the insertion portion 202 into the slit 101S, the opening 202A that is provided in the insertion portion 202 is disposed between the lenses within the lens frame 100, so as to be coaxial, or essentially coaxial, with the optical axis O of the lens.

The frame 201 of the blade driving device 200 has a recessed lens frame storing portion 201X with the insertion portion 202 protruding. In the state wherein the insertion portion 202 is inserted into the slit 101S, the lens frame 100 is contained within the lens frame storing portion 201X.

The cylinder 101 of the lens frame 100 comprises a pair of supporting faces 101A that are perpendicular to the optical axis O of the lens. Additionally, the lens frame storing portion 201X of the frame 201 in the blade driving device 200 has contact surfaces 201Y that contact each of the pair of supporting faces 101A. In the example in FIGS. 1a-1b, the contact surfaces 201Y are provided on the top and bottom faces of a fitting portion 201Z that fits between the pair of supporting faces 101A. The fitting portion 201Z is structured from a portion of the lens frame storing portion 201X (the portion indicated by the dotted line in FIG. 1a).

Given such an optical unit 1, in a state wherein the insertion portion 202 of the blade driving device 200 is inserted into the slit 101S of the lens frame 100, the state will be one wherein the fitting portion 201Z of the lens frame storing portion 201X is fitted between the pair of supporting faces 101A in the lens frame 100, in a state wherein the contact surface 201Y is in contact with the pair of supporting faces 101A. Through this, the lens frame 100 will be positioned and supported by the frame 201 of the blade driving device 200, and thus the movement of the lens frame 100 in the optical axial direction is prevented, making it possible to prevent contact between the lens within the lens frame 100 and the insertion portion 202.

Moreover, in the optical unit 1, as illustrated in FIG. 2, the insertion tip end of the slit 101S holds the insertion portion 202 therebetween. This makes it possible to prevent rattling of the insertion portion 202, and contact with the lens, after insertion into the slit 101S.

Figure 3A:
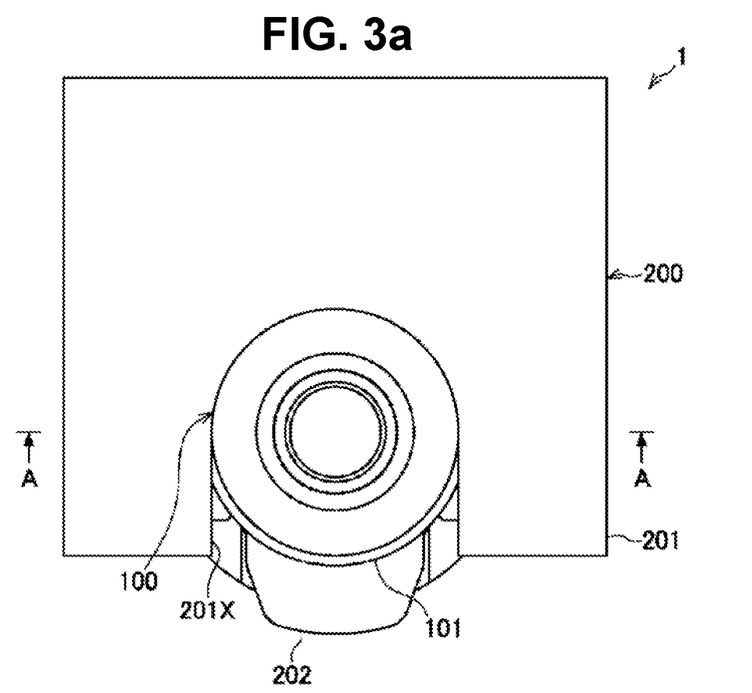
FIGs. 3a-3c are more explanatory diagrams depicting an optical unit according to an example according to the present invention (wherein FIG. 3a is a plan view and FIG. 3b is a cross-sectional view along the section A-A in FIG 1a, and FIG. 3c is a partial enlarged view of T in FIG. 3b).
Figure 3B:
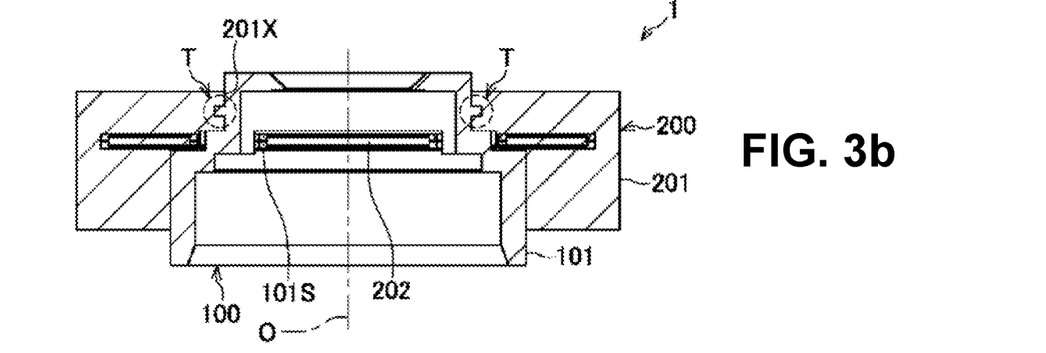
Figure 3C:
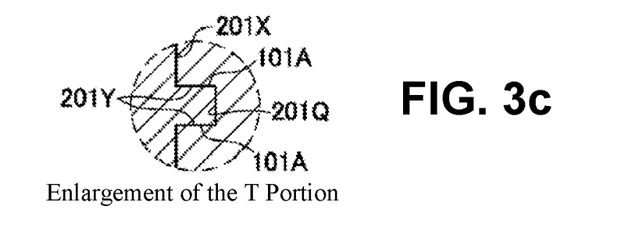

The example of the optical unit 1 depicted in FIGS. 3a-3b differ from the example depicted in FIGS 1a-1b in the structure in the enlarged view of the T portion. In this example, the pair of supporting faces 101A in the lens frame 100 are formed in a part that protrudes from the outer periphery of the cylinder 101, where a fitted portion 201Q is provided at the lens frame storing portion 201X in the blade driving device 200, and the contact surfaces 201Y, for contacting the pair of supporting faces 101A, are formed on this fitted portion 201Q. Through such a structure as well, the lens frame 100 will be positioned and supported by the frame 201 of the blade driving device 200, preventing movement of the lens frame 100 in the optical axial direction, making it possible to prevent contact between the insertion portion 202 and the lens within the lens frame 100.

Figure 4A:
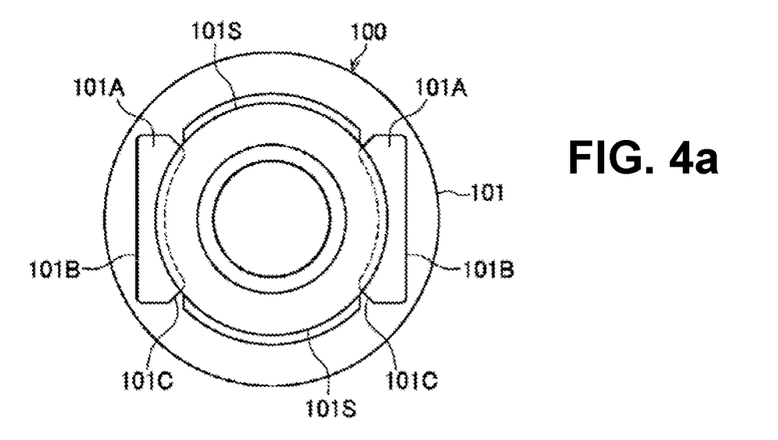
FIG. 4a is an explanatory diagram depicting an optical unit (a lens frame) according to another example according to the present invention.
Figure 4B:
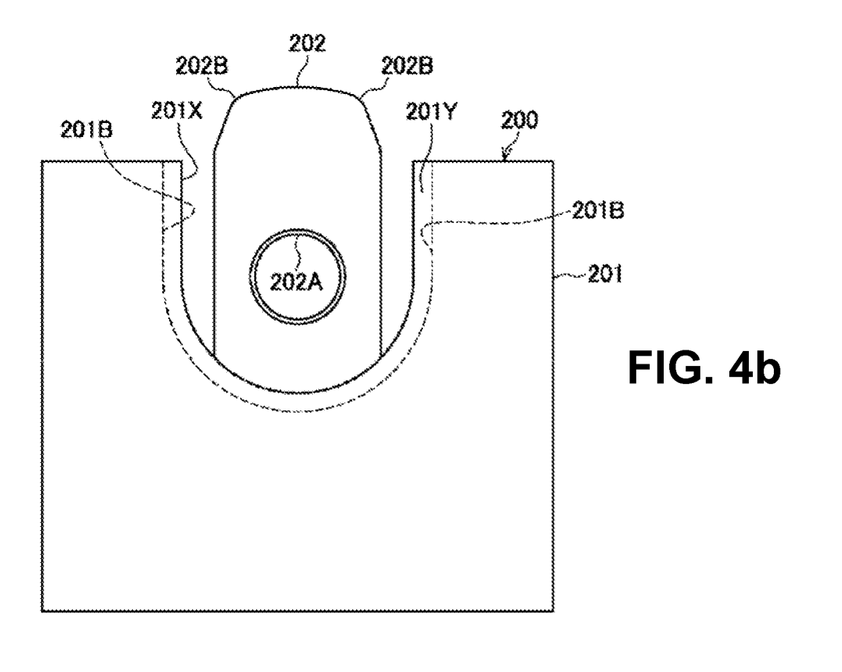
FIG. 4b is an explanatory diagram depicting an optical unit (a blade driving device) according to another example according to the present invention.

In the example of an optical unit 1 depicted in FIGS. 4a-4b, guide surfaces 201B and 101B, for guiding the insertion portion 202 linearly in the direction for insertion into the slit 101S are formed in the lens frame storing portion 201X in the blade driving device 200, and in the cylinder 101 of the lens frame 100. Tapered portions 202B and 101C, for guiding to the guide surfaces 201B and 101B, described above, are provided at the tip end portion of the insertion portion 202, and at the entrance into the slit 101S.

Given such an example, when the insertion portion 202 is inserted into the slit 101S, the insertion portion 202 is guided by the tapered portions 202B and 101C, to contact the guide surfaces 201B and 101B. Through this, the insertion portion 202 will be inserted into the slit 101S in a state wherein it is guided linearly by the guide surfaces 201B and 101B, preventing the insertion portion 202 from becoming crooked, enabling insertion of the insertion portion 202 into a narrow space between lenses in a stabilized state.

Note that, in another embodiment, a clip for holding the lens frame 100 in cooperation with the frame 201 may be used in order to prevent the lens frame 100 from coming out. For example, in the state wherein the insertion portion 202 of the frame 201 has been inserted into the slit 101S, the lens frame 100 is held between the frame 201 and the clip.

An example of the structure of a blade driving device 200 will be explained using FIG. 5 and FIGS. 6a-6b. The blade driving device 200 comprises, within the frame 201, described above, a driving member 2, a blade supporting unit 4, and blade members 5 (5X and 5Y). The frame 201 is structured from a base frame 10 and a cover frame 11 that covers the base frame 10, to form a driving frame chamber 3S that contains the driving member 2 therein. The driving member 2 is supported movably on a supporting face 10A of the base frame 10, so as to move the blade members 5 (5X and 5Y) through moving on a plane. The example in the figure, the blade member 5 is a plurality of blades (2 blades), but it may instead be of a single blade.

A magnet 20 and a coil 21, which are the driving source, are attached to the driving member 2 and the frame 201. In the example in FIG. 5, the magnet 20 is attached to the driving member 2 and the coil 21 is attached to the frame 201 (the cover frame 11), where power is applied to the coil 21 through a wiring board (a flexible substrate) 22, to cause the driving member 2 to undergo reciprocating motion in the X direction in the figure. The driving member 2 is supported movably in a supporting groove 10B of a supporting face 10A on a bearing 23. Moreover, a Hall element (detecting member) 30, for detecting movement of the driving member 2 or the blade member 5 (5X, 5Y) is disposed on the wiring board 22 at a position corresponding to the magnet 20.

The blade members 5 (5X, 5Y) are connected to the driving member 2, either directly or through connecting members 7. In the example depicted in FIG. 5, the connecting member 7 is borne within the frame 201. In the connecting member 7, a bearing portion 7A, in the center, is borne on a shaft 10P of the base frame 10, where connecting portions 7B, on both ends thereof, pass through elongated holes 4B of the blade supporting unit 4, and are respectively connected in connecting holes 5B of the blade members 5X and 5Y, where, near the center, the connecting portion 7C passes through an elongated hole 4C of the blade supporting unit 4, and is connected to the driving member 2. Through this, when the driving member 2 undergoes reciprocating motion linearly along the X direction, the connecting member 7 rotates around the shaft 10P, so that the blade members 5X and 5Y, which are connected to the connecting portions 7B, move in mutually opposing directions along the X direction.

The blade member 5 (5X, 5Y) is supported on a blade supporting unit 4. The blade supporting unit 4 is structured from opposing thin plate members 12 and 13, made from thin metal plates, or the like. The opposing thin plate members 12 and 13 form a blade chamber for containing the blade member 5 (5X, 5Y) in the interior thereof. The blade supporting unit 4 has an opening 202A. The blade member 5 (5X, 5Y) is slid, by the driving member 2, to advance into the opening 202A. In the example in the figure, the blade member 5 (5X, 5Y) has an opening 5A, where the degree of overlap of the opening 5A in the opening 202A is adjusted variably by the movement in the X direction in the figure.

Figure 5:
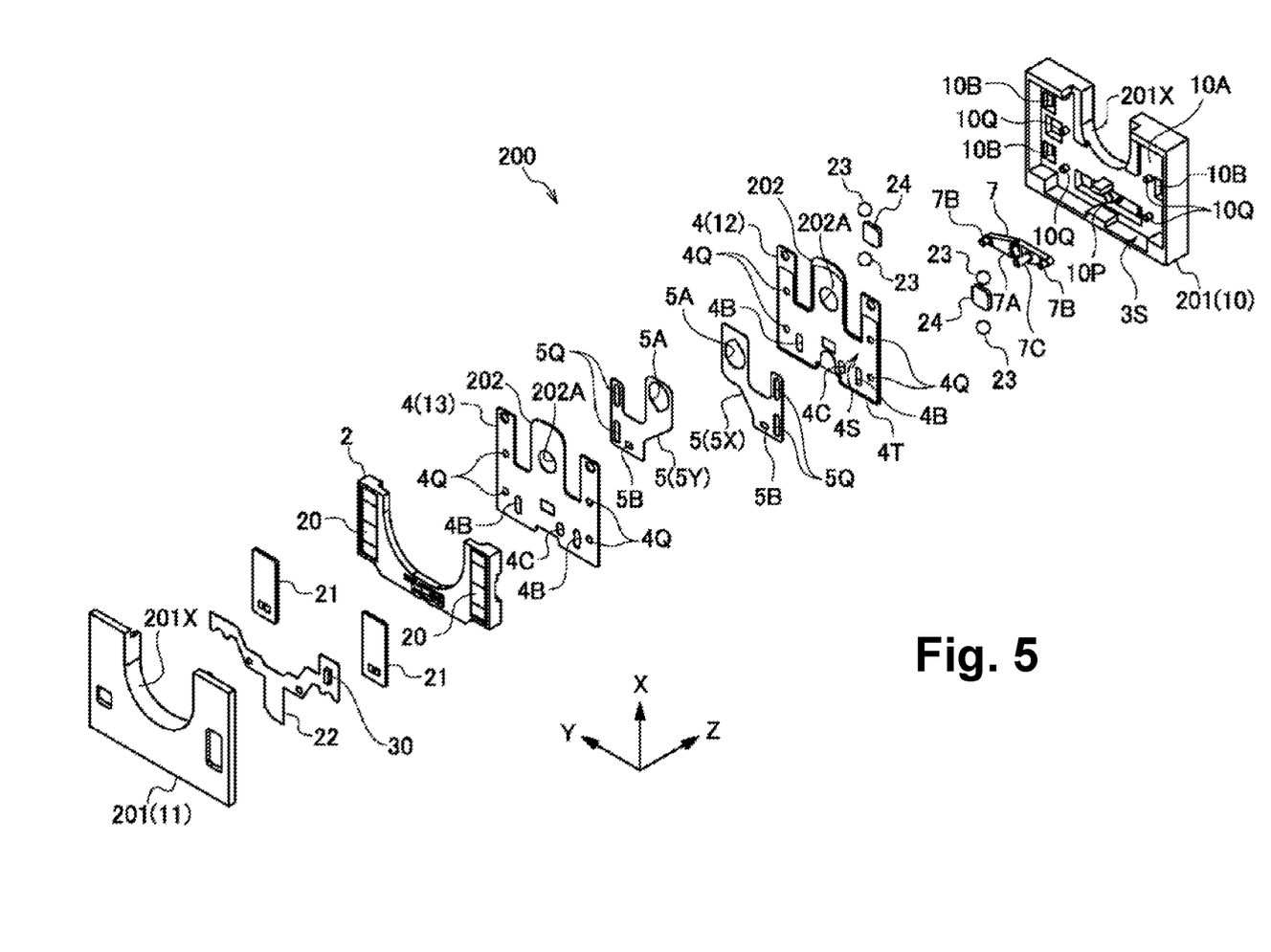
FIG. 5 is an assembly perspective diagram of a blade driving device.

In FIG. 5, a protrusion 10Q of the base frame 10 fits into a hole 4Q of the blade supporting unit 4, to engage the blade supporting unit 4 with the base frame 10, and, additionally, the protrusion 10Q is inserted into a guide hole (elongated hole) 5Q of the blade member 5 (5X, 5Y) that is supported on the blade supporting unit 4, to guide the movement of the blade member 5 (5X, 5Y). Moreover, within the frame 201 (the base frame 10), a magnetic material 24 is disposed to hold the blade member 5 in an initial position, and to attract the driving member 2 in the optical axial direction relative to the base frame 10.

Figure 6A:
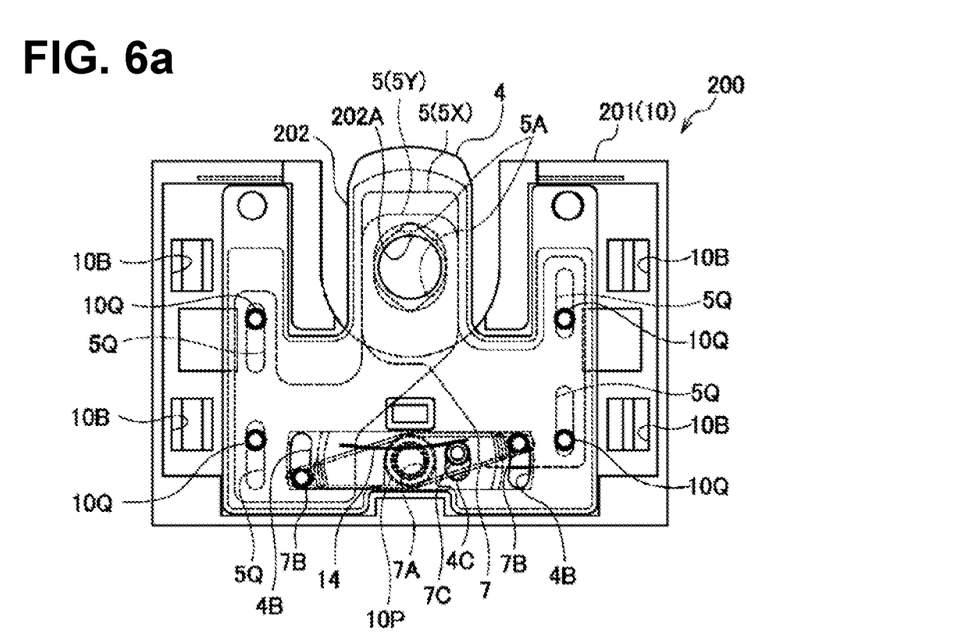
FIGS. 6a-6b are an interior explanatory diagrams of a blade driving device (wherein FIG. 6a shows the fully opened state and FIG. 6b shows the closed state).
Figure 6B:
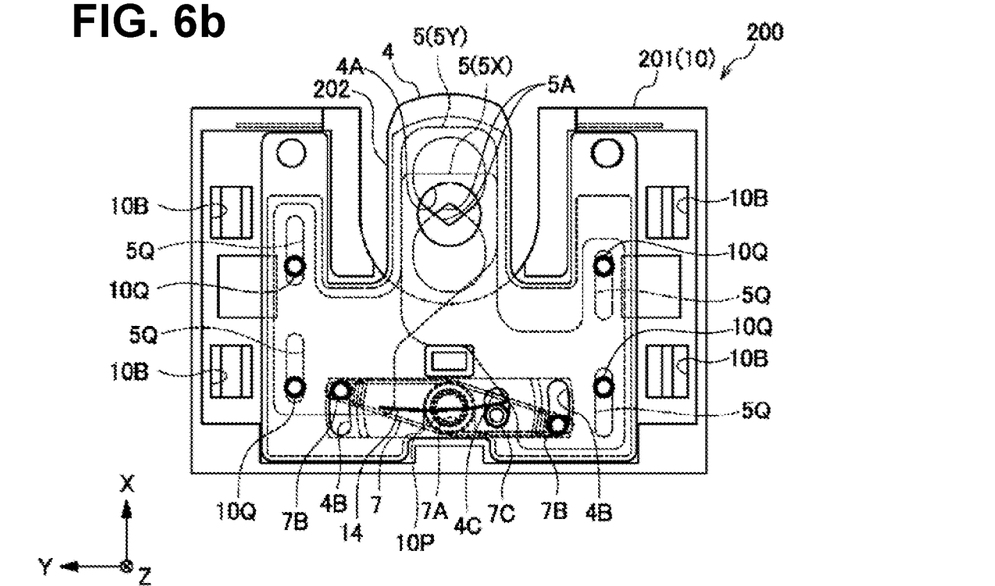

FIGS. 6a-6b depict the movement of the blade member 5 (5X, 5Y). In the example in the figure, an example is shown wherein the blade driving device 200 has the function of an iris device for variably adjusting the brightness of light that passes through the opening 202A. (a) depicts the fully open state of the opening 202A through the rotation of the connecting member 7 by the movement of the driving member 2 (not shown), described above, and (b) depicts the state wherein the opening area is closed through overlapping of the opening 5A within the opening 202A. While, in the example in the figure, an example of an iris device is depicted, the blade driving device 200 may instead function as a shutter device for blocking the light that passes through the opening 202A by fully closing the opening 202A by the blade members 5 (5X and 5Y) overlapping, or may function as a filter device through attaching a filter, for limiting the wavelengths or brightness of the light, to end portions of the openings 5A of the blade members 5 (5X and 5Y).

Note that in the example depicted in FIGS. 6a-6b, in the connecting portion between the driving member 2, not shown, and the connecting member 7, one end is secured to the driving member 2, and the other end is provided with an elastic member (a leaf spring) 14 that presses the connecting portion 7C of the connecting member 7. Through connecting the driving member 2 and the connecting member 7 through the elastic member 14 in this way, the movement of the driving member 2 can be transmitted to the connecting member 7 without rattling, making it possible to increase the accuracy of movement of the blade members 5 (5X and 5Y), enabling an increase in the accuracy of brightness adjustment.

Figure 7:
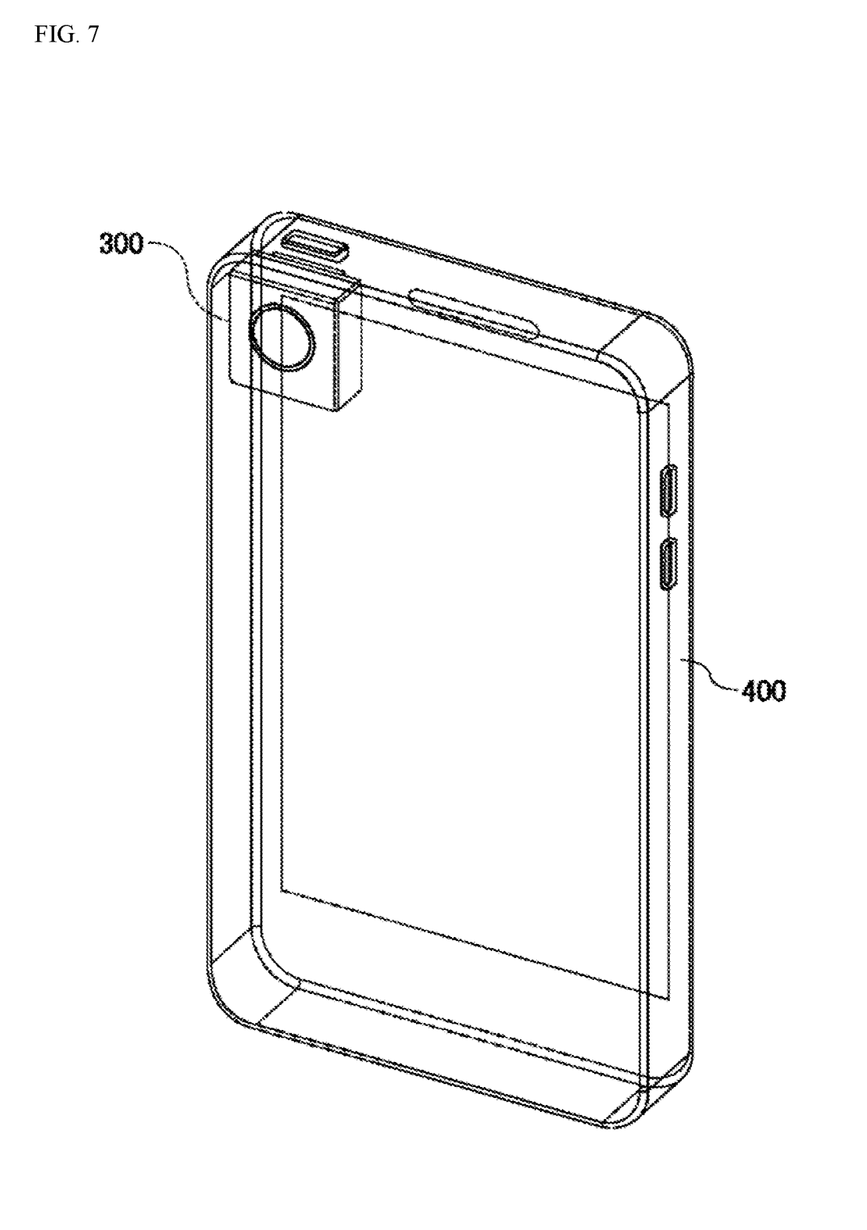
FIG. 7 is an explanatory diagram depicting a mobile electronic device (mobile information terminal) equipped with an optical unit.

FIG. 7 depicts a mobile electronic device (mobile information terminal) 400 that is equipped with a camera 300 that is equipped with the optical unit 1 described above. The mobile electronic device 400, such as a smart phone, or the like, has severe limitations on the thickness of the units packaged in the interior thereof, but the camera 300, as described above, enables a reduction in thickness through assembly with the blade driving device 200 contained within the thickness of the lens frame 100, thus enabling packaging with excellent spatial efficiency in a mobile electronic device 400 that targets high portability and design characteristics.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. An optical unit, comprising:
  a lens frame comprising a slit in a cylinder; and
  a blade driving device comprising:
    an insertion portion inserted into the slit, wherein an opening that is provided in the insertion portion is disposed between lenses in the lens frame, and
    a frame that has a recessed lens frame storing portion with the insertion portion protruding;
  wherein the cylinder of the lens frame further comprises a pair of supporting faces that are perpendicular to an optical axis of the lenses; and
  the lens frame storing portion of the frame comprises contact surfaces that contact each of the pair of supporting faces.

2. The optical unit as set forth in claim 1, wherein:
  the contact surface is provided with a fitting portion or a fitted portion between the pair of supporting faces.

3. The optical unit as set forth in claim 1, further comprising:
  a guide surface provided in the lens frame storing portion and the cylinder of the lens frame guiding linearly in the direction in which the insertion portion is inserted into the slit.

4. The optical unit as set forth in claim 3, further comprising:
  a tapered portion provided at a tip end portion of the insertion portion and at the entrance to the slit guiding to the guide surface.

5. The optical unit as set forth in claim 1, further comprising:
  insertion tip ends of the slit holding the insertion portion therebetween.

6. The optical unit as set forth in claim 1, wherein:
  the blade driving device comprises a blade supporting unit supporting the blade member slidably between opposing thin plate members; and
  the insertion portion is provided in the blade supporting unit.

7. A camera provided with an optical unit as set forth in claim 1.

8. A mobile electronic device comprising a camera as set forth in claim 7.

* * * * *